United States Patent [19]

Nishikawa et al.

[11] 4,377,217
[45] Mar. 22, 1983

[54] POWER STEERING SYSTEM HAVING HYDRAULIC REACTION CHAMBERS

[75] Inventors: Masao Nishikawa, Tokyo; Takashi Aoki, Wako; Yoichi Sato, Fujimi, all of Japan

[73] Assignee: Honda Giken Kogyo Kabushiki Kaisha, Tokyo, Japan

[21] Appl. No.: 162,650

[22] Filed: Jun. 24, 1980

[30] Foreign Application Priority Data

Jun. 27, 1979 [JP] Japan .............................. 54-87802[U]

[51] Int. Cl.³ .......................... B62D 5/06; B62D 5/08
[52] U.S. Cl. .................................... 180/143; 180/132; 180/148
[58] Field of Search .................. 180/148, 143, 132; 91/434

[56] References Cited

U.S. PATENT DOCUMENTS

| | | |
|---|---|---|
| 3,693,747 | 9/1972 | Nishikawa ............................ 180/143 |
| 3,973,640 | 8/1976 | Nishikawa et al. .................. 180/132 |
| 3,994,361 | 11/1976 | Nishikawa et al. .................. 180/143 |
| 4,000,785 | 1/1977 | Nishikawa et al. .................. 180/143 |
| 4,154,317 | 5/1979 | Nishikawa et al. .................. 180/143 |
| 4,275,798 | 6/1981 | Nishikawa et al. .................. 180/143 |
| 4,279,323 | 7/1981 | Ando et al. .......................... 180/148 |
| 4,293,051 | 10/1981 | Nishikawa ............................ 180/133 |
| 4,299,302 | 11/1981 | Nishikawa et al. .................. 180/148 |

FOREIGN PATENT DOCUMENTS

| | | | |
|---|---|---|---|
| 2755545 | 6/1978 | Fed. Rep. of Germany ...... | 180/148 |
| 1224123 | 6/1960 | France ................................ | 180/148 |
| 55-22560 | 2/1980 | Japan .................................. | 180/143 |
| 55-140651 | 11/1980 | Japan .................................. | 180/148 |

OTHER PUBLICATIONS

Automotive Engineering, Jul. 1979, vol. 87, No. 7, pp. 70-72.

*Primary Examiner*—Joseph Paul Brust
*Attorney, Agent, or Firm*—Irving M. Weiner; Pamel S. Burt; John L. Shortley

[57] ABSTRACT

A power steering system for vehicles includes a four-way valve slidable in response to applied steering torque for selectively connecting a pair of hydraulic oil chambers of a servo cylinder to a hydraulic pressure source and an oil reservoir. A pair of hydraulic reaction chambers are disposed one on each side of the four-way valve and each contain a pair of plungers and a spring interposed therebetween. The plungers are held by and between a pair of diametrical pins supported on the valve and spaced axially from each other. When the reaction chambers are pressurized by an increased speed of the vehicle or a change in resistance from the road surface, the plungers are urged against the pins on the valve to prevent the latter from being slid axially, thereby allowing the driver of the vehicle to feel a suitable resistance to turning of the steering wheel without being assisted by auxiliary power from the servo cylinder.

16 Claims, 5 Drawing Figures

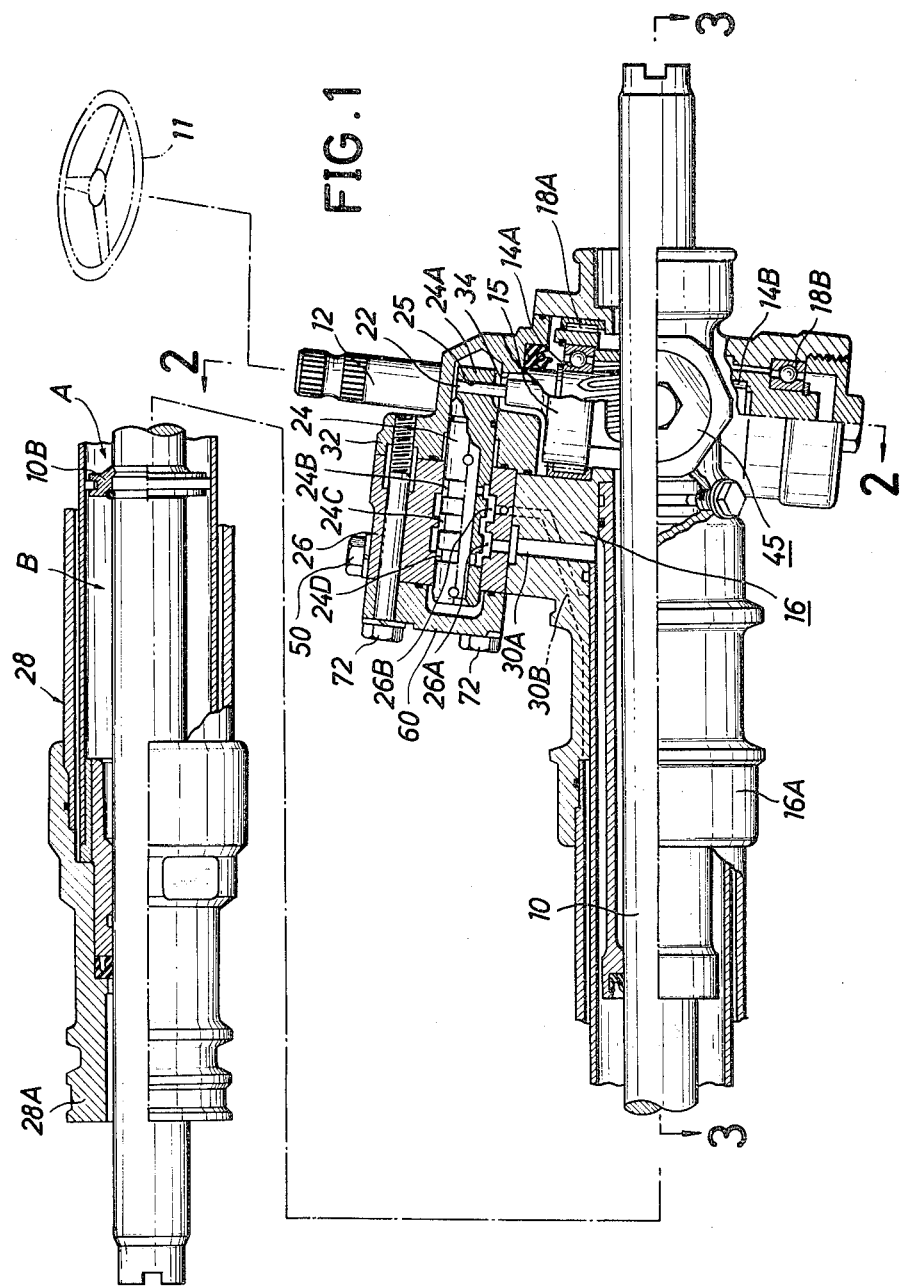

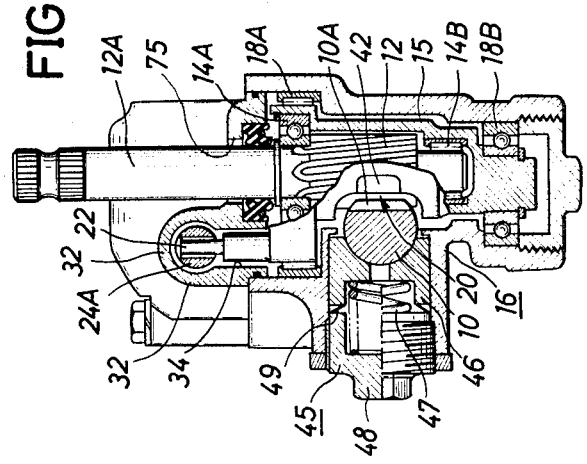
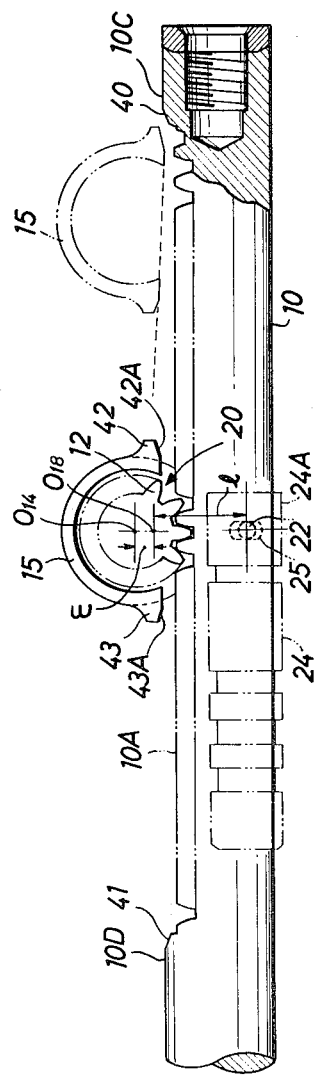

4,377,217

POWER STEERING SYSTEM HAVING HYDRAULIC REACTION CHAMBERS

BACKGROUND OF THE INVENTION

1. Field of the Invention

The present invention relates to a power steering system for vehicles which includes hydraulic reaction chambers for giving the vehicle operator a suitable reactive force or resistance to turning of the steering wheel.

2. Prior Art

There has heretofore been known a power steering system for vehicles which comprises a servo cylinder having a pair of hydraulic oil chambers, a four-way valve slidable in response to steering torque for selectively connecting the hydraulic oil chambers to a hydraulic pressure source and an oil reservoir, and a plurality of hydraulic reaction chambers disposed alongside of and substantially parallel to the valve and containing plungers and springs. The plungers are actuatable under hydraulic pressure in the hydraulic reaction chambers for limiting sliding movement of the four-way valve, thereby rendering steering torque that is necessary to variably rotate the steering wheel based on speeds of the vehicle and resistances from the road surface so as to enable the driver to feel a suitable resistance to turning of the steering wheel. The prior arrangement including the four-way valve and the reaction chambers has been relatively large in size because at least four reaction chambers are disposed circumferentially of the valve and the plungers in the reaction chambers are held between disk-shaped washers or thrust bearings mounted on the ends of the four-way valve.

Since the power steering system includes, in addition to the components described above, other attachments such as fluid conduits, a pump, and a gear box, a relatively wide space is required in the engine compartment of the vehicle. However, with the emission control apparatus being presently disposed in the engine compartment, the space available for a power steering system has become small. There has accordingly been a need for a smaller power steering system and hence smaller hydraulic reaction chambers. It has also been desired that the hydraulic reaction chambers be easily assembled and disassembled for easy maintenace and/or repair work in a limited space available in the engine compartment.

SUMMARY OF THE INVENTION

It is an object of the present invention to provide a power steering system having hydraulic reaction chambers which will eliminate the foregoing difficulty and meet the above-noted demands.

Another object of the present invention is to provide a power steering system having hydraulic reaction chambers which are relatively small in size and can be easily assembled and disassembled for easy repair work.

According to the present invention, a pair of hydraulic reaction chambers are disposed one on each side of a slidable four-way valve, which supports thereon a pair of diametrical pins spaced from each other in the axial direction of the valve, the hydraulic reaction chambers containing plungers held by and between the pair of pins.

The above and other objects, features and advantages of the present invention will become apparent from the following detailed description when taken in conjunction with the accompanying drawings which illustrate a preferred embodiment of the invention by way of example.

BRIEF DESCRIPTION OF THE DRAWINGS

FIG. 1 is a cross-sectional view of an essential part of a power steering system of a rack-and-pinion type constructed in accordance with the present invention.

FIG. 2 is a cross-sectional view taken along line 2—2 of FIG. 1.

FIG. 3 is a cross-sectional view taken along line 3—3 of FIG. 1, showing only parts necessary for explanation in connection therewith.

DESCRIPTION OF THE PREFERRED EMBODIMENT

Figure 4:
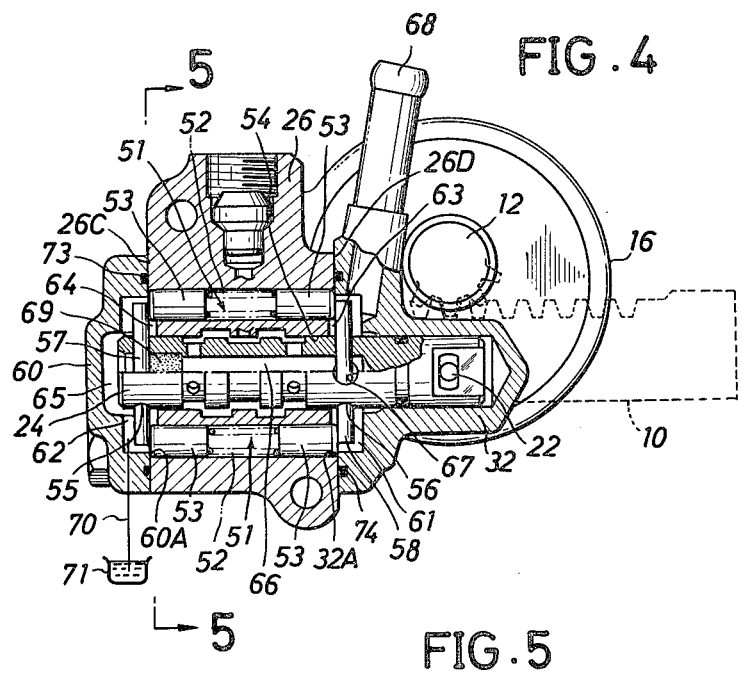
FIG. 4 is a cross-sectional view taken along line 4—4 of FIG. 5, showing reaction chambers in the power steering system.

In FIG. 1, there is shown a rack shaft 10 extending through a power cylinder 28 so as to serve as a piston shaft as well as the output member of the power steering system. The rack shaft 10 has the opposite ends thereof engaged by steering road wheels of a vehicle (not shown). A pinion gear shaft 12 meshes with the rack 10A (FIG. 2) of the rack shaft 10, and is rotatable through operation of a steering wheel 11 so as to produce a linear motion of the rack shaft 10. The pinion gear shaft 12 is rotatably supported on two bearings 14A and 14B in a swing cage 15, which is in turn rotatably supported on two bearings 18A and 18B in a gear box 16.

As shown in FIG. 2, the axes of the bearings 14A, 14B are out of alignment with those of the bearings 18A, 18B so that the respective rotational axes $O_{14}$, $O_{18}$ of the pinion gear shaft 12 and the swing cage 15 are eccentric with respect to each other by a distance $\epsilon$ in a direction perpendicular to the axis of the rack shaft 10, as shown in FIG. 3. The swing cage 15 has a portion thereof formed as a window (opening) 20 through which the pinion gear shaft 12 meshes with the rack shaft 10, as described above. The window 20 of the swing cage 15 has its opposite side edges provided with slippers 42, 43 projected axially of the rack shaft 10. The slippers 42, 43, which are integral with the swing cage 15, have surfaces 42A, 43A disposed opposite the rack shaft 10 and tapered such that the distance between the surfaces 42A, 43A and the associated surface of the rack shaft 10 becomes gradually larger towards the free ends of the surfaces 42A, 43A. The swing cage 15 has its upper portion formed integrally with an actuating rod 22 for actuating a four-way valve 24 which comprises a slidable valve of an open center type. The actuating rod 22 is disposed above the cage 15 at the same side as the rack shaft 10, and is spaced from the axis $O_{18}$ of the cage 15 by a distance l. The actuating rod 22 is inserted in an elongated bore 25 formed in an end portion 24A of the four-way valve 24. A swinging motion of the actuating rod 22 about the axis $O_{18}$ causes a sliding motion of the valve body of the directional control valve 24 in the axial direction of the rack shaft 10.

Formed in the surfaces of the four-way valve 24, which is shown as held in its neutral position by the force of springs 52 in hydraulic reaction chambers (described hereinbelow), are three annular grooves 24B, 24C, and 24D, the central one 24C of which is in fluid communication with the delivery side of a hydraulic oil source (not shown), which may comprise a hydraulic oil pump. The annular grooves 24B, 24D disposed on the respective opposite sides of the central groove 24C are in fluid communication with an oil reservoir (not shown), which may comprise an oil tank. The directional control valve 24 is disposed in a housing 26 for sliding movement therein, the housing 26 having two annular grooves 26A and 26B formed therein. The pinion gear shaft 12 is supported by the gear box 16 which has an integral elongated sleeve 16A that extends leftwardly in FIG. 1. The servo cylinder 28 is fitted in the sleeve 16A and has a pair of right and left hydraulic oil chambers A, B separated by a piston 10B of the rack shaft 10. The annular grooves 26A, 26B are held in fluid communication with the chambers A, B, respectively, by channels 30A, 30B, respectively. When the valve body of the valve 24 is displaced axially, the hydraulic oil chambers A, B are selectively connected through the channels 30A, 30B, respectively, to the hydraulic pressure source and the oil reservoir so that auxiliary power for assisting in rotating the steering wheel can be obtained by an oil pressure acting on the piston 10B of the rack shaft 10 in the servo cylinder 28. The housing 26 is covered with a cover 32 having a bore 34 through which the actuating rod 22 extends. The swing cage 15 is permitted to make a reciprocal swinging motion about the axis $O_{18}$ until the actuating rod 22 strikes the inner wall surface of the bores 34.

As clearly shown in FIG. 3, the rack 10A on the rack shaft 10 has its opposite end portions formed with camming portions 40, 41 in the form of slanted surfaces. The directions of inlination of the slanted surfaces 40, 41 are such that the surfaces 40, 41 gradually become projected radially outwardly of the rack shaft 10 towards the respective ends of the shaft 10.

As shown in FIG. 2, arranged at the rear side of the rack shaft 10, i.e., at the opposite side of the rack shaft 10 to the pinion gear shaft 12, is an urging assembly 45 which comprises a rack guide 46 disposed in contact with the rear side surface of the rack shaft 10 for guiding the rack shaft 10 being moved, a spring 47 urging the rack shaft 10 towards the pinion gear shaft 12, a guide screw 48 disposed at a rear side of the rack guide 46 for adjusting the urging force of the spring 47, and a Belleville spring 49 interposed between the rack guide 46 and the screw 48.

While no steering torque is acting, the four-way valve 24 is maintained in its neutral position under the resiliency of the springs 52. The oil under pressure supplied from the hydraulic pressure source, therefore, continues to be returned to the oil reservoir by the open-center type four-way valve 24. At this time, the slippers 42, 43 of the swing cage 15 lie parallel to the rack shaft 10 as illustrated in FIG. 3, and the swing cage 15 is in its neutral position.

When the steering wheel 11 is rotated to give steering torque in the clockwise direction as viewed in FIG. 3, the steering torque is transmitted from the pinion gear shaft 12 to the rack shaft 10 so that the swing cage 15, against which the pinion gear shaft 12 is urged by the urging force of the urging assembly 45 via the rack shaft 10, is acted upon by the frictional rotational force of the bearings 14A, 14B produced by the rotation of the pinion gear shaft 12 as well as the steering torque of the shaft 12 to make a clockwise swinging motion about the axis $O_{18}$. The displacement of the shaft 12 caused by such swinging motion is amplified by the lever ratio $1/\epsilon$ through the actuating rod 22 integral with the swing cage 15, and the amplified displacing force acts upon the directional control valve 24 such that the valve 24 is moved to establish connections between the oil source and the right hydraulic chamber A as well as between the oil source and the left hydraulic chamber B, thus supplying assisting power to the power cylinder 28. At such time, the slippers 42, 43 of the swing cage 15 are positioned in a plane slightly clockwise inclined, as indicated by the broken lines in FIG. 3. As the rack shaft 10 is linearly moved towards its stroke end by the assisting power and the rotational force of the pinion gear shaft 12, the right camming portion 40 thereof approaches the slipper 42. The slipper 42 and the camming portion 40 strike against each other immediately before the stroke end, and then the slipper 42 slips onto the cylindrical portion 10C which is continuous with the camming portion 40. At this time, the swing cage 15 which has been inclined is returned until the slippers 42, 43 are in a plane parallel with the rack shaft 10. Accordingly, the directional control valve 24 is returned to its neutral position.

The hydraulic pressure source is now connected to the oil reservoir, whereupon the steering wheel 11 requires an increased or heavy steering torque so as to be rotatable and the oil pump can be unloaded just before the end of stroke of the rack shaft 10.

When the pinion gear shaft 12 is rotated in the counterclockwise direction by the steering wheel 11, the swing cage 15 is swung leftwardly, and correspondingly, the assisting power is applied reversely against the above-mentioned direction and the left camming portion 41 of the rack shaft 10 approaches the slipper 43. The slipper 43 then strikes the camming portion 41 and rides onto the left cylindrical portion 10D, whereupon the swing cage 15 is restored to its neutral position to allow the valve 24 to return to the neutral position thereof.

The housing 26 which accommodates the valve 24 is detachably secured by a bolt 50 to an upper portion of the gear box 16 including the elongated sleeve 16A by which the servo cylinder 28 is supported, as shown in FIG. 1. With such an arrangement, the channels 30A, 30B which connect the annular grooves 26A, 26B in the housing 26 and the hydraulic oil chambers A, B of the servo cylinder 28 can be formed in the gear box 16, and no separate hydraulic pipes are necessary. The valve 26 can be located remotely from the road surface so as to be protected from impacts due to interference with projections of the road surface.

As shown in FIG. 4, a pair of hydraulic reaction chambers 51, 51 are disposed in the housing 26 one on each side of the valve 24 and extend parallel thereto in diametrically opposite relation. Each of the reaction chambers 51, 51 is supplied with oil under pressure directly from the hydraulic pressure source, or from the hydraulic pressure source through a conventional pressure-reducing valve actuatable in response to vehicle speeds or changes in the resistance from the road surface. Each reaction chamber 51, 51 contains a pair of plungers 53, 53 and a compression coil spring 52 interposed therebetween. The reaction chambers 51, 51 as well as cylinder bore 54 in the housing 26 in which the valve 24 is slidably received, extend through the housing 26 between opposite end faces 26C, 26D thereof.

The valve 24 has an axial length such that the valve 24 has portions projecting beyond the end faces 26C, 26D. The portions of the valve 24 which project beyond the end faces 26C, 26D have diametrical through holes 55, 56, respectively, in which a pair of pins 57, 58 are securely inserted, respectively, as with a press fit, the pins 57, 58 extending diametrically of and being spaced axially of the valve 24 from each other. Each of the pins 57, 58 extends as far as the reaction chambers 51, 51 to hold the plungers 53, 53 in the reaction chambers 51, 51 by and between the pins 57, 58.

Figure 5:
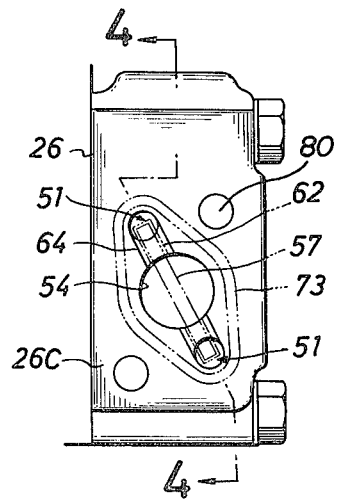
FIG. 5 is an end view of a valve housing as viewed from line 5—5 of FIG. 4, with a pin and a sealing member being illustrated in imaginary lines.

As shown in FIG. 5, the pins 57, 58 are preferably arranged so as to be disposed substantially diagonally relative to the substantially rectangular housing 26, i.e., the pins 57, 58 are disposed substantially diagonally relative to the end faces 26C, 26D. Further, a pair of holes 80 provided in the end face 26C for receiving bolts therein are also arranged substantially diagonally relative to end face 26C, such that a line passing through holes 80 extends in substantially opposite diagonal relation to pin 57. Such diagonal arrangement of the pins and bolt holes is highly efficient with respect to minimizing the size of the valve housing.

The end face 26D of the housing 26 is covered by the cover 32, and the other end face 26C is covered by a cap 60. The plungers 53, 53 are located in position by abutment with end faces 32A, 60A of the cover 32 and the cap 60, respectively. When the valve 24 is axially slid from the neutral position due to swinging movement of the swing cage 15, either the pin 57 or 58, depending on the direction of the sliding movement of the valve 24, displaces the plungers 53 with the springs 52 being compressed. Recesses 61, 62 are cut off from the end faces 32A, 60A of the cover 32 and cap 60, respectively, the recesses 61, 62 having a depth in the direction of sliding movement of the valve 24. Slots 63, 64 are cut off from the end faces 26C, 26D, respectively, of the housing 26, the slots 63, 64 having a depth in the direction of sliding movement of the valve 24. These recesses 61, 62 and slots 63, 64 allow movement of the pins 57, 58 due to sliding movement of the valve 26.

The cap 60 has a concaved portion 65 to which the left end portion of the valve 24 faces as shown in FIG. 4. When the valve 24 is slid axially leftwardly, oil in the concaved portion 65 is forced to flow through a coaxial passage 66 in the valve 24, a hole 67 in a peripheral portion of the valve 24, which communicates with the passage 66, thence through a discharge pipe 68 integral with the cover 32, and back into the oil reservoir. Alternatively, where the passage 66, the hole 67, and the pipe 68 have an increased resistance to the flow of oil therethrough, and hence there will be a back pressure built up in the concaved portion 65, which tends to prevent smooth sliding movement of the valve 24, the passage 66 may be closed off by a plug 69 and oil in the concaved portion 65 may be led through a conduit 70 into an oil reservoir 71.

As the vehicle speed increases or the resistance from the road changes, the hydraulic reaction chambers 51 are pressurized with an increased pressure, which then acts through the plungers 53 on the pins 57, 58, whereupon the valve 24 is prevented from being slid axially, thereby allowing the vehicle driver to feel a suitable resistance to turning of the steering wheel 11 without being assisted by the auxiliary power from the servo cylinder 28.

As illustrated in FIG. 1, the cap 60 and the cover 32 are detachably fixed together to the housing 26 by bolts 72. Accordingly, the cap 60 and the cover 32 can be disassembled from the housing 26 simply by removing the bolts 72 for easy servicing of the valve 24 and the reaction chambers 51. The cap 60 and the cover 32 can easily be assembled and attached to the housing only by tightening the bolts 72.

Sealing members 73, 74 are interposed between the end faces 26C, 26D of the housing 26 and the end faces 32A, 60A of the cover 32 and cap 60 for preventing oil leakage. Each sealing member 73, 74 is substantially in the form of an elliptical ring, as shown in FIG. 5 which shows only the sealing member 73 on the cap 60, as an example. The elliptical sealing members 73, 74 have a major axis extending in alignment with the reaction chambers 51, 51 arranged one on each side of the cylinder bore 54 in which the valve 24 is received. The cylinder bore 54, the reaction chambers 51, 51, the recess 62, and the slot 64 are surrounded by the looped sealing member 73 as shown in end elevation in FIG. 5. With the two hydraulic reaction chambers 51, 51 employed, the sealing members 73, 74 are of an elliptical ring shape with an area to be sealed therein being held at a minimum.

The cover 32 constitutes a portion, as an upper cover, of the gear box 16 which supports the pinion gear shaft 12, as shown in FIGS. 1 and 2. The pinion gear shaft 12 has a shaft portion 12A extending upwardly through a hole 75 in the cover 32 with a clearance.

The cap 60, the housing 26, and the cover 32 which are fixed together by the bolts 72 can be detached from the gear box 16 by removing the bolt 50 that secures the housing 26 to the gear box 16 as illustrated in FIG. 1, and then by lifting the housing 26. The housing 26, the cap 60, and the cover 32 can then be disassembled simply by loosening and removing the bolts 72 as described above.

Although a certain preferred embodiment has been shown and described in detail, it should be understood that changes and modifications may be made therein without departing from the scope of the appended claims.

What is claimed is:

1. A power steering system comprising:
 (a) a servo cylinder having a pair of hydraulic oil chambers defined therein by a piston for providing hydraulic assistance to the steering operation;
 (b) a hydraulic pressure source for supplying hydraulic oil to said system;
 (c) an oil reservoir;
 (d) a four-way valve operatively connected between said hydraulic oil chambers and said hydraulic pressure source and oil reservoir, said four-way valve being movable from a neutral position thereof in response to steering torque applied to said power steering system for selectively connecting said pair of hydraulic oil chambers to said hydraulic pressure source and said oil reservoir, said valve supporting a pair of pins extending diametrically thereof and spaced axially from each other; and
 (e) a pair of hydraulic reaction chambers operatively connected with said hydraulic pressure source, said hydraulic reaction chambers being disposed one on each side of and substantially parallel to said valve and each containing a pair of plungers and a spring interposed therebetween, said springs normally urging said four-way valve toward said neutral position thereof through said plungers, and said plungers and said springs in said pair of hydraulic reaction chambers being held between said pair of pins.

2. A power steering system according to claim 1, said valve having a pair of diametrical holes, said pair of pins extending through said diametrical holes, respectively, and secured to said valve.

3. A power steering system according to claim 1, including an input member operably connected with a steering wheel so as to be rotated in response to operation of said steering wheel, and an output member operatively cooperating with said input member, said output member extending through said servo cylinder and being translatable in response to rotation of said input member for power steering operation.

4. A power steering system according to claim 3, said input member comprising a shaft having a pinion, and said output member comprising a shaft having a rack held in mesh with said pinion.

5. A power steering system according to claim 3, including a gear box, and a cage angularly movably supported in said gear box, said input member being rotatably journalled in said cage, and said valve being slidable for said selective connection in response to angular movement of said cage due to rotation of said input member.

6. A power steering system according to claim 5, said cage having an actuating rod, said valve having a hole receiving said actuating rod therein, whereby said valve is slidable by said actuating rod upon angular movement of said cage.

7. A power steering system according to claim 3, including a gear box supporting said input member, and a housing accommodating said valve and mounted on an upper portion of said gear box.

8. A power steering system according to claim 7, said housing having a pair of annular grooves extending around said valve, and a pair of channels connecting said annular grooves to said hydraulic oil chambers, respectively, of said servo cylinder.

9. A power steering system according to claim 7, said housing being detachably fixed to said gear box.

10. A power steering system according to claim 1, including a housing having opposite end faces, said hydraulic reaction chambers being formed in said housing and extending between said end faces, said housing having a through hole extending between said end faces and receiving said valve, and a cover and a cap which are mounted on said end faces such that opposed end face portions of said cover and said cap hold said plungers in position within said hydraulic reaction chambers.

11. A power steering system according to claim 10, said cover and said cap being detachably attached to said housing.

12. A power steering system according to claim 10, wherein:
said valve has an axial length such that said valve has portions thereof projecting beyond said end faces of said housing;
said pins are secured to said portions, respectively, of said valve projecting beyond said end faces; and
said end faces and opposed faces of said cover and said cap jointly define recesses having a depth in the direction of sliding movement of said valve for allowing said pins to move therein in response to sliding movement of said valve.

13. A power steering system according to claim 12, including sealing members interposed between said end faces of said housing and said opposed faces of said cover and said cap, each of said sealing members being substantially in the form of an elliptical ring having a major axis extending in alignment with said hydraulic reaction chambers arranged one on each side of said valve.

14. A power steering system according to claim 10, including an input member having a shaft portion for power steering operation, and a gear box supporting said input member, said cover comprising a portion of said gear box as a cover thereof and having a hole through which said shaft portion of said input member extends.

15. A power steering system according to claim 1, further comprising:
a substantially rectangular housing having opposite end faces, said hydraulic reaction chambers being formed in said housing and extending between said end faces;
said housing having a through hole extending between said end faces and receiving said valve; and
said pins being arranged so as to extend substantially diagonally relative to said end faces.

16. A power steering system according to claim 15, wherein:
each said end face is provided with a pair of bolt holes arranged such that a line passing therethrough extends in substantially opposite diagonal relation to said pins.

* * * * *